Sept. 2, 1952 W. R. FRANK 2,608,814
OFFSET DISK HARROW
Filed Aug. 8, 1946 2 SHEETS—SHEET 1
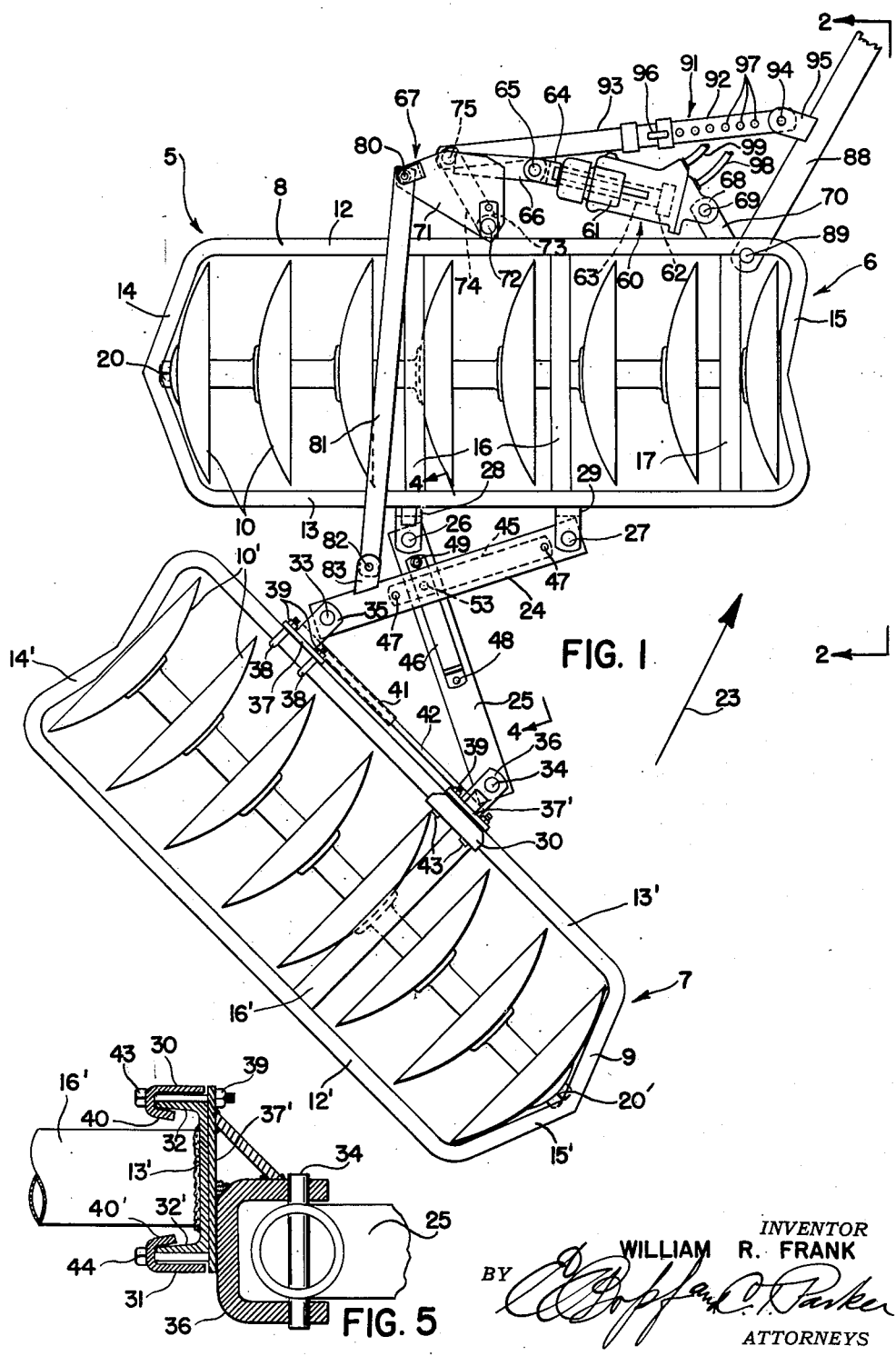
INVENTOR
WILLIAM R. FRANK
BY
ATTORNEYS Sept. 2, 1952     W. R. FRANK     2,608,814
OFFSET DISK HARROW Filed Aug. 8, 1946     2 SHEETS—SHEET 2

INVENTOR
WILLIAM R. FRANK
BY
ATTORNEYS

UNITED STATES PATENT OFFICE 2,608,814

OFFSET DISK HARROW

William R. Frank, Bell, Calif., assignor to John Deere Killefer Company, a corporation of California Application August 8, 1946, Serial No. 689,211

11 Claims. (Cl. 55—83)

The present invention relates generally to agricultural implements and more particularly to disk harrows, with particular reference to disk harrows of the offset type, and has for its principal object the provision of a novel and improved harrow which is simple and efficient but strong and durable in operation.

A further object of my invention relates to the provision of a novel and improved means for connecting a fluid pressure actuated motor such as a hydraulic cylinder and piston assembly so as to act between the front and rear gangs of the implement to provide for angling the two gangs from transport position to working position.

Still another object relates to the provision for shifting the draft member of the implement laterally simultaneously with angling the gangs, all under the control of the hydraulic cylinder and piston assembly. It has been found that when the gangs are angled from working position to transport position by means of a hydraulic cylinder, the gangs tend to shift toward the left of the tractor, with the result that when the implement is operating in left hand offset position this additional shift to the left results in some difficulty in making a left hand turn and also results in damage to plants when disking alongside a crop row.

A further object of my invention relates to the provision of a pair of crossed links for flexibly connecting the two gangs together, one of the links being connected to the hydraulic cylinder for transmitting force from the latter to the gangs during angling movement.

A further feature of my invention relates to the provision of novel clamping means for connecting the links to the rear gang, providing for lateral sliding movement relative thereto. Thus, by loosening one of the clamps at a time, the links can be shifted laterally by operating the fluid motor, thereby changing the connection between the two gangs in such a manner that the rear gang is adjusted laterally relative to the front gang. The working angle between the gangs is increased when the two clamped connections are shifted toward each other, and therefore another object relates to limiting this angle to a predetermined maximum by a telescoping member which prevents the clamping connections from being adjusted closer together than the predetermined spacing.

Still another object relates to the provision of crossed links of such construction and arrangement that one link bears upon the other to prevent one of the gangs from twisting relative to the other gang and thus holding the two gangs with their axes substantially in a common horizontal plane. Still another object relates to the provision of wear plates installed upon the link members to take the wear occasioned by the two links rubbing and sliding upon each other during operation. A further object relates to the provision of an adjustment for shifting at least one of the wear plates to compensate for wear on the wear plates and in the pivot connections between the links and the gangs.

These and other objects and advantages of my invention will be apparent to those skilled in the art after a consideration of the following description, in which reference is had to the drawings appended hereto, in which Figure 1 is a top plan view of an offset disk harrow embodying the principles of the present invention, showing the gangs disposed in angled left hand offset working position;

Figure 5 is an enlarged sectional elevational view taken along a vertical plane passing through one of the slidable link connections.

Figure 3:
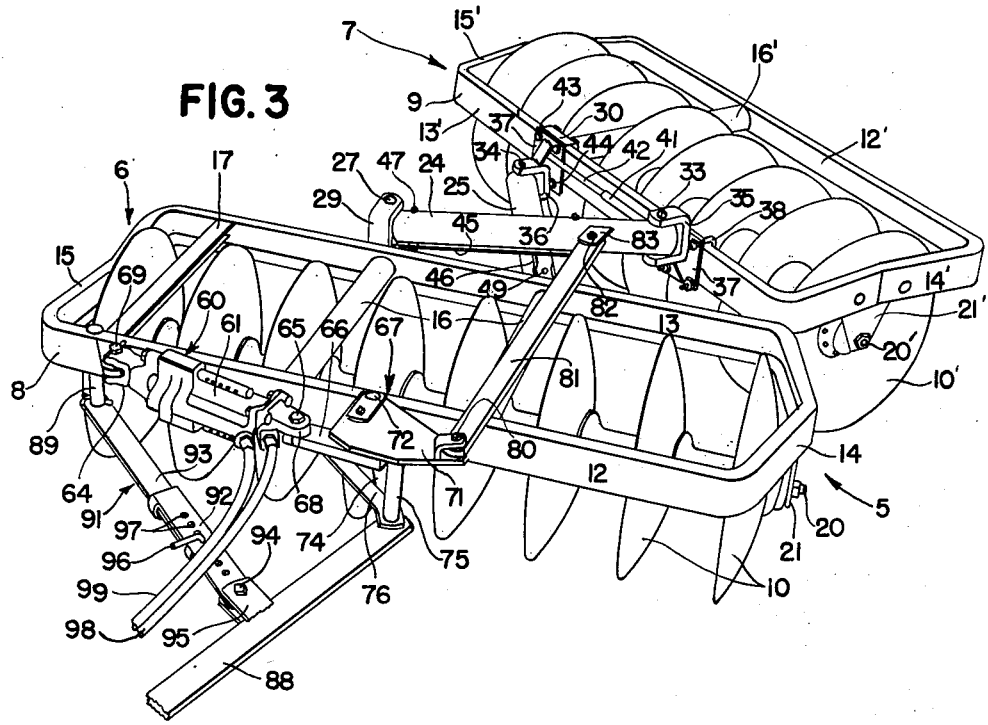
Figure 3 is a perspective view of the offset disk harrow with the gangs disposed in right hand offset working position, and drawn to a smaller scale.
Figure 2:
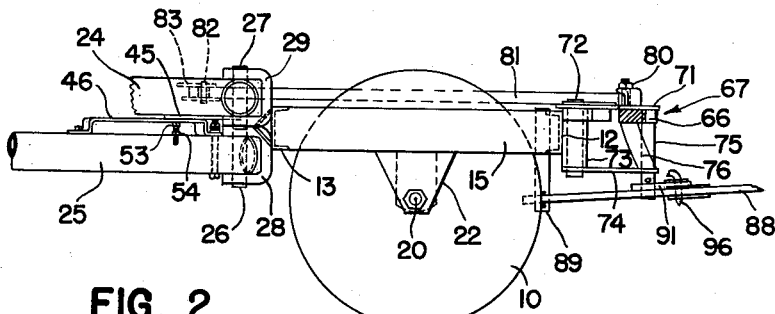
Figure 2 is a side elevational view of the front gang as viewed along a line 2—2 in Figure 1.
Figure 4:
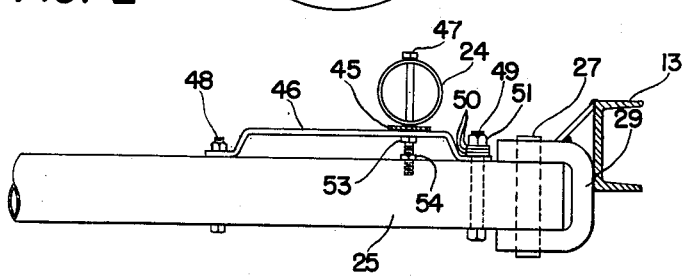
Figure 4 is a fragmentary sectional elevational view taken along a line 4—4 in Figure 1, and drawn to an enlarged scale.

Referring now to the drawings, the harrow is indicated in its entirety by reference numeral 5 and comprises a front gang 6 and a rear gang 7, each of the gangs comprising a horizontally disposed structural frame 8, 9, within which is mounted a series of disks 10, 10'. The front gang frame 8 comprises a structural channel member bent to define a rectangular frame including a pair of transversely disposed fore and aft spaced portions or members 12, 13, and a pair of end portions or members 14, 15. Bracing members 16, 17 extend fore and aft between the frame members 12, 13 and are rigidly connected thereto. The disks 10 are mounted on a common gang bolt 20, and revolve as a unit and the gang bolt 20 is supported in vertical depending brackets 21, 22 mounted on the end members 14, 15, respectively, in a manner well known to those skilled in the art.

The rear gang frame 9 is constructed generally similar to the front gang frame 8 and therefore similar reference numerals, primed, have been used to indicate corresponding parts. It will be noted that the rear gang 7 is reversed with respect to the front gang so that the concave sides of the disks 10' are disposed to face toward the left, whereas in the front gang 6 the concave sides are faced toward the right. Thus, when the harrow moves in the direction of the arrow 23 (Figure 1) the front gang disks turn the soil toward the right, while the rear gang disks return the soil to the left.

The gangs 6, 7 are interconnected by a pair of tubular crossed links in the form of pipe sections 24, 25, which are pivotally connected to the frame member 13 of the front gang by means of a pair of pivot pins 26, 27 extending vertically through the forward ends of the links 24, 25, respectively, and through aligned apertures in a pair of C-shaped brackets 28, 29, which are rigidly fixed, as by welding, to the back side of the transverse member 13.

The rear ends of the links 24, 25 are connected to the rear gang 7 by means of a pair of vertical pivot pins 33, 34 carried in a pair of C-shaped brackets 35, 36. One of the brackets 35 is fixed on a plate 37, the latter being disposed vertically in front of the rear gang frame channel member 13' and is secured thereto by means of a pair of laterally spaced vertically disposed U-shaped clamping bolts 38, which straddle the frame member 13' and are secured to the plate 37 by nuts 39. When the nuts 39 are loosened, the U-shaped clamps 38 are released, permitting the associated plate 37 and bracket to be slidably shifted laterally relative to the frame member 13' to adjust the position of the rear gang 7 relative to the front gang 6.

Referring particularly to Figure 5, the other bracket 36 is welded to a plate 37' which is mounted on the front of the rear gang frame channel 13' by means of a pair of upper and lower slidable connectors 30, 31 comprising plates disposed rearwardly of the front plate 37' and extending rearwardly across the top and bottom flanges 32, 32' of the channel 13', respectively, and having U-shaped flanges 40, 40' turned inwardly around the edges of the flanges 32, 32'. Upper and lower bolts 43, 44 extend across the upper and lower flanges 32, 32' between the latter and the plates 30, 31, respectively, and through apertures in the plate 37 and suitably aligned apertures in the flanges 40, 40'. Since the channel flanges 32, 32' are spaced above and below the tubular bracing member 16' of the gang frame 9, the flanges 40, 40' are free to slide along the channel 13' past the brace 16' when the bolts 43, 44 are loosened.

The rear gang 7 can be shifted laterally relative to both of the brackets 35, 36 to adjust the rear disks relative to the ridges and furrows left by the front disks, or one of the brackets 35 or 36 can be adjusted independently to adjust the maximum angle between the two gang axes in one position. It is desirable, however, to limit the maximum angle to which the gangs are swung when in working position, and this is accomplished by providing a pair of telescoping members 41, 42 disposed between the two brackets 35, 36 with their outer ends connected to the latter, respectively. The inner member 42 is adapted to slide into the outer member 41 until it bottoms in the latter, thereby serving as a limit stop which prevents the two brackets 35, 36 from being moved any closer together, but permitting the latter to be spread apart to decrease the angle between the gangs. The nuts 39 are tightened to secure the brackets 35, 36 in adjusted position.

During operation in the direction of the arrow 23, the right end of the front gang and the left end of the rear gang tend to dig lower than the opposite ends of the two gangs, and for this reason, the link 24, which is connected between the two ends, first mentioned above, is placed above the link 25 and is adapted to bear upon the latter to restrain the two gangs from twisting out of their horizontal plane. The links 24, 25 are made strong enough to resist this force without bending, and for this reason the links are made in tubular form, of appreciable diameter, and by supporting them in pivot bearings between the upper and lower arms of the C-shaped brackets 28, 29, 35, 36, the bearings are of sufficient vertical extent to rigidly hold the gangs against twisting.

In order to prevent the links 24, 25 from becoming weakened due to wearing action of one upon the other, wearing strips 45, 46 are secured to the adjacent sides of the links 24, 25, respectively. The upper wearing strip 45, which is secured to the bottom side of the upper link 24 by suitable bolts or screws 47, comprises a flat strip of metal which lies closely against the bottom of the upper link 24. The lower wearing strip 46 is secured to the top of the lower tubular link 25 by a pair of bolts 48, 49 extending through aligned apertures in the link 25 and in the two ends of the wearing strip 46, but the intermediate portion of the wearing plate 46 is offset upwardly from the link 25 to provide a bearing portion against which the upper wear plate 45 is adapted to engage.

The bolt 49 is provided with a plurality of washers 50 and a nut 51. The washers 50 are normally disposed above the end of the wear plate 46 and are secured by the nut 51 to hold the end of the plate rigidly against the top of the link 25. However, during prolonged usage of the implement, a certain amount of looseness will develop in the connection between the two gangs, due to wear on the wear plates 45, 46 and also on the pivot pins 26, 27, 33, 34 and their bearings. This looseness can be taken up to a large extent by raising the wear plate 46 relative to the link 25 upon which it is secured. This is accomplished by removing the nut 51 and bolt 49 and transferring one or more of the washers 50 to a position on the bolt 49 between the wear plate 46 and the link 25, after which the nut 51 can be replaced on the bolt and retightened.

A stud 53 is threaded in a nut 54 which is welded to the top of the link 25 directly beneath the wear plate 46. The stud 53 can be adjusted vertically relative to the nut 54 and is shifted upwardly into engagement with the bottom of the plate 46 to support the latter and to prevent the latter from being bent downwardly. The stud 53 can be adjusted from time to time to compensate for wear on the plates 45, 46 and, of course, when the washers 50 are shifted beneath the end of the wear plate 46, the stud 53 is adjusted upwardly to engage the wear plate 46 once again.

The gangs 6, 7 are shifted angularly relative to one another by means of a fluid pressure actuated motor 60, comprising an extensible cylinder and piston assembly including a hydraulic cylinder 61 and a piston 62 slidable therein and connected by a piston rod 63 to a bifurcated connector 64, which is connected by a pivot pin 65 to a crank arm 66, which is part of a bell crank assembly, indicated in its entirety by reference numeral 67. The cylinder 61 is provided with a bearing lug 68 which, in the left hand offset position of the harrow shown in Figure 1, is mounted on a vertical pivot pin 69 carried on a bracket 70 which is rigidly fixed, as by welding, to the front frame member 12 of the front gang.

The crank arm 66 is welded to a supporting plate 71, which is fixed to a vertical pivot pin 72 journaled in a vertical sleeve 73 which is rigidly fixed, as by welding, to the front side of the front frame member 12. A lower arm 74 is fixed to the lower end of the pivot pin 72 and extends forwardly and outwardly and is rigidly connected to the lower end of a post 75 which depends from the plate 71. A brace 76 extends downwardly and outwardly from the arm 66 to the lower end of the post 75, to which it is rigidly fixed, as by welding.

The outer corner of the plate 71 is pivotally connected by a bolt 80 to a rearwardly extending link 81, which extends rearwardly over the front gang frame 8 between a pair of adjacent disks 10 and is pivotally connected at its rear end by means of a bolt 82 to a bracket or lug 83 welded to the forward side of the upper link 24.

The harrow is drawn by means of a draft member 88, which, in left hand offset position, is pivotally mounted on a vertical pivot pin 89 secured to the front frame member 12 near the right hand end thereof and extends forwardly to a suitable coupling device (not shown) by means of which the draft member can be coupled to the drawbar of a tractor. A transverse extensible draft member 91 comprises a pair of longitudinally slidable sections 92, 93 pivotally connected at 94 to a bracket 95 secured to the intermediate portion of the draft member 88, while the other end of the draft member 91 is pivotally connected to the lower end of the post 75. The slidable sections 92, 93 of the draft member 91 can be shifted relative to each other to shift the drawbar 88 angularly about the pin 89 to adjust the amount of offset of the harrow 5 relative to the tractor (not shown), in a manner well known to those skilled in the art, and the sections 92, 93 are secured together by means of a coupling pin 96, which can be inserted through aligned apertures 97 in the draft member sections 92, 93, respectively.

Fluid is forced under pressure through either of a pair of supply hoses 98, 99, which are connected to the cylinder 61 and communicate with the latter on opposite sides of the piston 62, respectively. The hoses 98, 99 are flexible and extend to hydraulic control mechanism (not shown) on the tractor. When fluid is forced into the left end of the cylinder 61 through the hose 99, the piston 62 is forced toward the right to contract the cylinder and piston assembly 60, swinging the bell crank assembly 67 in a clockwise direction about its supporting pivot 72, as viewed in Figure 1, thereby pulling forwardly on the link 81 and drawing the harrow gangs into the angled working position, shown in Figure 1. This movement of the bell crank 67 shifts the transverse draft member 91 toward the right, thereby swinging the drawbar 88 toward the right or, in effect, shifting the entire harrow toward the left relative to the tractor. This is the extreme left hand offset position of the harrow relative to the tractor.

The harrow is returned to transport position, in which the axes of the gangs are substantially parallel, by forcing fluid into the right hand end of the cylinder 61 through the hose 98, and allowing the fluid on the left side of the piston 62 to be forced back to the control mechanism on the tractor through the other hose 99. This causes the motor 60 to extend, swinging the bell crank 67 in a counterclockwise direction, as viewed in Figure 1, thereby shifting the link 81 rearwardly to swing the gangs to a substantially parallel position, and simultaneously to shift the draft member 91 toward the left, together with the drawbar 88, but since the latter is connected to the tractor, the effect is to shift the harrow toward the right relative to the tractor. This counteracts the tendency of the gangs to shift toward the left when coming out of a working position into the transport position, thereby avoiding damage to the row of trees or vines, along which the harrow is operating.

Referring now to Figure 3, the harrow can be made to operate in a right hand offset position relative to the tractor, by disconnecting the drawbar 88 from the pin 89 and disconnecting the draft member 91 from the post 75 and reversing the draft members, reconnecting the drawbar 88 to the post 75 and the draft member 91 to the vertical pin 89. The cylinder 60 should also be reversed by removing the pins 65, 69 and reversing the cylinder end for end. Intermediate positions of the harrow relative to the tractor can be obtained by removing the pin 96 from the transverse draft member 91 and shortening the latter by sliding the overlapping members 92, 93 relative to each other, replacing the pin 96 in a suitable pair of aligned apertures in the sections 92, 93 in any desired position of adjustment.

The hydraulic motor 60 can be used for shifting the connections of the links to the rear gang for purposes of adjustment. This is accomplished by loosening the nuts 39 on the U-shaped clamps 38, after which the cylinder and piston assembly 60 can be actuated in one direction or the other to cause the corresponding plate 37 to shift relative to the front frame member 13' of the rear gang 7. The nuts 39 are then tightened and the bolts 43, 44 on the other securing plate 37' are loosened, after which the motor 60 can be actuated to shift the link connection along the channel member 13'. Thus, the adjustments of the rear gang 7 laterally relative to the front gang 6 can be accomplished by power exerted through the hydraulic motor, while the telescoping limit guides 41, 42 limit the maximum working angle of the gangs, as described.

During operation, any desired working angle between the predetermined maximum and the parallel transport position can be obtained by extending or contracting the cylinder and piston assembly 60 to any desired extent.

I claim:

1. A disk harrow comprising a pair of front and rear disk gangs, means including a pair of crossed links for flexibly connecting said gangs together, said links being pivotally mounted on one of said gangs and having clamps at their opposite ends, respectively, whereby each clamp is slidable laterally on the other gang relative thereto and relative to the other clamp but fixable relative thereto in adjusted position, a hydraulic motor mounted on said harrow, and means connecting said motor with one of said pair of links and operable to slide the rear end of one of said links relative to said rear gang by power from said motor with one of said clamps loosened and to angle said gangs relative to each other with both of said clamps tightened.

2. A disk harrow comprising a pair of front and rear disk gangs, means including a pair of crossed links for flexibly connecting said gangs together, said links being pivotally mounted on one of said gangs and having clamps at their opposite ends, respectively, slidable laterally on said rear gang but fixable relative thereto in adjusted position, a hydraulic motor mounted on said harrow, means connecting said motor with one of said pair of links and operable to slide the latter relative to said rear gang by power from said motor with one of said clamps loosened, and a pair of telescoping members connected between said clamped ends of said links for limiting the extent of movement of said clamped ends toward one another.

3. A disk harrow comprising a pair of front and rear disk gangs, means including a pair of crossed links for flexibly connecting said gangs together with their axes disposed substantially in a common plane, said links comprising sections connected at opposite ends, respectively, to said gangs by means including vertically disposed pivot pins, said links being interengageable to resist twisting movement of said gangs to hold their axes in said common plane, a wear plate mounted on one of said links and engaging the other of said links, and means for adjusting said plate toward and away from said link on which it is mounted to compensate for wear.

4. A disk harrow comprising a pair of front and rear disk gangs, means including a pair of crossed links pivotally connected at opposite ends, respectively, to said gangs for interconnecting the latter with their axes disposed substantially in a common plane, providing for relative horizontal angling movement of said gangs and adapted to bear one upon the other to resist twisting movement of said gangs out of said common plane, a wear plate disposed between said links, a bolt for securing said plate to one of said links in a position to bear against the other link, and means including a plurality of washers adapted to be positioned on said bolt between said plate and said link to which it is secured, for spacing said plate outwardly thereof to compensate for wear.

5. A disk harrow comprising a pair of front and rear disk gangs, means including a pair of crossed links pivotally connected at opposite ends, respectively, to said gangs, for interconnecting the latter with their axes disposed substantially in a common plane, providing for relative horizontal angling movement of said gangs and adapted to bear one upon the other to resist twisting movement of said gangs out of said common plane, a wear plate disposed between said links, means for securing said plate to one of said links in a position to bear against the other link, and means including a threaded stud mounted between said plate and said link to which the plate is secured, and adjustable rotatably to force said plate relative to its supporting link toward said other link to compensate for wear.

6. A disk harrow comprising a pair of front and rear disk gangs, means including a pair of crossed links pivotally connected at opposite ends, respectively, to said gangs for interconnecting the latter with their axes disposed substantially in a common plane, providing for relative horizontal angling movement of said gangs and adapted to bear one upon the other to resist twisting movement of said gangs out of said common plane, a wear plate disposed between said links, a bolt for securing said plate to one of said links in a position to bear against the other link, means including a plurality of washers adapted to be positioned on said bolt between said plate and said link to which it is secured, for spacing said plate outwardly thereof to compensate for wear, and a threaded stud mounted on said one link and engageable with said plate at a point spaced from said bolt and adjustable rotatably to force said plate relative to said one link toward said other link.

7. A disk harrow comprising a pair of front and rear disk gangs flexibly connected together by means providing for relative horizontal swinging movement, a draft member, means pivotally connecting the rear end of the draft member to one end portion of the front gang for lateral swinging movement relative thereto, a bell crank pivotally connected with the generally central portion of said front gang at a point spaced from said pivotal connecting means and swingable in a generally horizontal plane, one portion of said bell crank being shiftable generally fore and aft and two other portions of said bell crank being shiftable generally laterally, an angling link pivotally connected to said one portion and to said rear gang, whereby swinging movement of said bell crank serves to change the angle between said gangs, a transverse link connected at one end to one of said two laterally shiftable portions of said bell crank and at its other end with said draft member, whereby swinging movement of said bell crank serves to swing said draft member laterally relative to said front gang, and means acting generally transversely of the harrow between said front gang and the other of said two laterally shiftable portions of said bell crank for swinging the latter so as to change the angle between said gangs and simultaneously swing said draft member laterally relative to said front gang.

8. A disk harrow comprising a pair of front and rear disk gangs flexibly connected together by means providing for relative horizontal swinging movement, a draft member, pivotal connecting means pivotally connecting the rear end of the draft member to the front gang adjacent one end of the latter, a bell crank pivotally connected with the generally central portion of said front gang at a point spaced from said pivotal connecting means and swingable in a generally horizontal plane, one portion of said bell crank being shiftable generally fore and aft and two other portions of said bell crank being shiftable generally laterally, an angling link pivotally connected to said one portion and to said rear gang, whereby swinging movement of said bell crank serves to change the angle between said gangs, means pivotally connecting the rear end of the draft member to one of said two laterally swingable portions of said bell crank, a transverse link pivotally connected at its outer end to the outer end portion of the front gang and at its inner end to the draft member forward of the connection of the latter with said bell crank, and means acting generally transversely of the harrow between said front gang and the other of said two laterally shiftable portions of said bell crank for swinging the latter so as to change the angle between said gangs and simultaneously swing said draft member laterally relative to said front gang.

9. A disk harrow comprising a pair of front and rear disk gangs flexibly connected together by means providing for relative horizontal swinging movement, each of said gangs including a generally horizontal frame disposed above the axis of rotation of the disks of the gang, a draft member, a part fixed to the front portion of the front gang frame and extending downwardly therefrom, means pivotally connecting the draft member to the lower end of said downwardly extending part for lateral swinging movement in a generally horizontal plane, a hydraulic cylinder and piston assembly disposed transversely at the front of said front gang frame generally in the plane thereof and pivotally connected at one end thereto, a vertically disposed rockshaft journaled on said front gang frame and having an actuating arm, means fixed to the upper end of said rockshaft and pivotally connected to said cylinder and piston assembly, a transverse link connected at one end to said draft member, a forwardly extending link connected with said rear gang and to said arm means, and arm means fixed to the lower end of said rockshaft and connected at its other end with said draft member.

10. A disk harrow comprising a pair of front and rear disk gangs, means pivotally connecting said gangs together with their axes disposed substantially in a common plane, a hydraulic motor, a bell crank pivoted to the front gang and including a first arm movable generally laterally and a second arm movable generally fore and aft, a connection between said bell crank and said hydraulic motor, a generally fore and aft extending link connected at its forward end to the fore and aft movable bell crank arm and at its rear end to the rear gang, a generally fore and aft extending draft member connected with front gang and swingable laterally, and means connecting the draft member with said generally laterally movable bell crank arm, whereby movement of said bell crank by said hydraulic motor to change the angle between said gangs acts to swing the forward end of said draft member laterally relative to the front gang.

11. A disk harrow comprising a pair of front and rear disk gangs, means including a pair of crossed links for flexibly connecting said gangs together with their axes disposed substantially in a common plane, a hydraulic motor, a bell crank pivoted to the front gang and including a first arm movable generally laterally and a second arm movable generally fore-and-aft, a connection between said bell crank and said hydraulic motor, a lug fixed to one of said crossed links, a generally fore-and-aft extending link connected at its forward end to the fore-and-aft movable bell crank arm and at its rear end to said lug, a generally fore-and-aft extending draft member connected with said front gang and swingable laterally, and means connecting the draft member with said generally laterally movable bell crank arm, whereby movement of said bell crank by said hydraulic motor to change the angle between said gangs acts to swing the forward end of said draft member laterally relative to the front gang.

WILLIAM R. FRANK.

REFERENCES CITED

The following references are of record in the file of this patent:

UNITED STATES PATENTS

| Number | Name | Date |
|---|---|---|
| 1,834,519 | Dewend | Dec. 1, 1931 |
| 1,912,125 | Brown | May 30, 1933 |
| 2,152,928 | Sjogren et al. | Apr. 4, 1934 |
| 2,341,139 | Dyrr | Feb. 8, 1944 |
| 2,357,148 | Turner | Aug. 29, 1944 |
| 2,406,866 | Thompson | Sept. 3, 1946 |